United States Patent
Price

(10) Patent No.: US 7,602,311 B2
(45) Date of Patent: Oct. 13, 2009

(54) VEHICLE DISTANCE MEASURING SAFETY WARNING SYSTEM AND METHOD

(76) Inventor: Sherry D. Price, 1104 Hawthorne Rd., Bonne Terre, MO (US) 63628

( * ) Notice: Subject to any disclaimer, the term of this patent is extended or adjusted under 35 U.S.C. 154(b) by 292 days.

(21) Appl. No.: 11/588,727

(22) Filed: Oct. 27, 2006

(65) Prior Publication Data

US 2008/0100428 A1    May 1, 2008

(51) Int. Cl.
*G08G 1/16*    (2006.01)
(52) U.S. Cl. .................. 340/903; 340/435; 340/436; 701/96; 701/301; 180/170
(58) Field of Classification Search .......... 340/903, 340/435, 436; 701/96, 93, 300–302; 180/167, 180/170
See application file for complete search history.

(56) References Cited

U.S. PATENT DOCUMENTS

| | | | |
|---|---|---|---|
| 4,970,509 A | 11/1990 | Kissinger | |
| 6,443,509 B1 | 9/2002 | Levin et al. | |
| 6,449,540 B1 * | 9/2002 | Rayner | 701/35 |
| 6,565,147 B1 | 5/2003 | Beals, Jr. | |
| 6,927,699 B2 * | 8/2005 | Samukawa et al. | 340/903 |
| 6,972,668 B2 * | 12/2005 | Schauble | 340/438 |
| 7,337,056 B2 * | 2/2008 | Arai | 701/96 |

* cited by examiner

*Primary Examiner*—Anh V La
(74) *Attorney, Agent, or Firm*—Raymond M. Galasso; Galasso & Associates, L.P.

(57) ABSTRACT

A vehicle distance measuring safety warning system and method is disclosed having one or more distance measurement sensors measuring the distance from the driver's vehicle to a second vehicle immediately in front. A vehicle distance alarm alerts the driver when the distance between the driver's vehicle and the second vehicle is less than a configured minimum distance, indicating an unsafe driving condition. An event record display device displays the time/date or the last twenty occurrences of the distance warning alarm. When an alarm is generated, a throttle set-back actuator operates to gently and automatically slow the car and increase vehicle to vehicle distance. Vehicle brakes may be automatically applied by the system to further slow the vehicle. The vehicle distance measuring safety warning system provides an additional margin of safety for a driver who may be distracted while driving.

11 Claims, 5 Drawing Sheets

VEHICLE DISTANCE MEASURING SAFETY WARNING SYSTEM AND METHOD

FIELD OF THE DISCLOSURE

The disclosures made herein relate to distance measurement devices for motor vehicles and, more specifically, to distance measurement sensors, electronic controllers and alarm devices for sensing, calculating the distance between two motor vehicles, recording and generating an alarm if the distance is less than a defined minimum distance.

BACKGROUND

When it comes to operating a vehicle, the recent increases in 'undesirable' driver behavior by distracted drivers are making driving a more dangerous activity. Often distractions originate from the driver's attempts to multi-task while operating a motor vehicle. For example, eating and drinking while in the motor vehicle first became popular during the rise of drive-thru restaurants in the 1950s. Cup holders have become standard in today's vehicle, evidence that such activities have become common place while operating a motor vehicle. Radios, CD-players, climate controls, televisions, DVD players, personal digital assistants (PDAs), reading and taking notes for 'to do' lists and meetings in activity planners, the unsafe occasional use of personal computers, as well as personal care activities such as shaving or applying makeup while driving, all are becoming more prevalent and increasing the danger to the distracted driver and the danger to others on the highway. One of the frequently discussed distracted driver issues today is the use of cellular or mobile phones while driving. Talking while on the mobile phone is not illegal in all states or in all parts of the world. Still it is documented that driving is considerably compromised during the use of the mobile phone while driving, as well as by the other multi-tasking activities outlined above. This puts other drivers at increased risk of bodily injury or death. Published statistics point to between 4,000 to 8,000 vehicle collisions directly related to multi-task driving occurring in the United States every year.

There is a need for a system to detect unsafe vehicle operation, specifically a driver following too closely behind another vehicle, and alert the operator in time to prevent an accident. Such a system could be based upon existing non-contact distance sensors and technology. Examples of applications using known vehicle distance sensor technology include short range reverse distance sensors secured to the rear of a motor vehicle and designed for use when backing a vehicle. Such sensors are adapted to sense objects, a pet or person located behind the vehicle and to alert the driver while backing or parking the vehicle before an accident or injury occurs. When the vehicle is put into reverse, the reverse distance sensor alerts the driver of the presence of objects present in the backup path of the vehicle within the limited range of the sensor.

There remains however a need for a vehicle distance measuring safety warning system and method for alerting a driver when the driver is following at too close of a distance behind another vehicle. Following too close behind another vehicle is also called 'tailgating' and is a major cause of vehicle accidents from fender-benders to accidents with multiple fatalities. When determining the distance to follow behind another vehicle, one must take into account the reaction time of the driver, as well as the response time of the vehicle to the application of the vehicle brakes, essentially the distance and time required to de-accelerate or completely stop the vehicle. While certain factors are not known with absolute accuracy, there are published government safety standards on recommended distances to maintain between vehicles to provide the vehicle driver the time to react to the unexpected.

Therefore, a vehicle distance measuring safety warning system that monitors the distance between a motor vehicle and the next motor vehicle in front of the driver's motor vehicle, a system which generates an alarm and activates a recording device when the distance between the two motor vehicles is less than a configured minimum distance, a system that in certain embodiments is adapted to reduce the engine throttle when the distance alarm is generated so as to increase the distance between the motor vehicles, a system that in certain embodiments is equipped to activate the vehicle braking system when the detected distance between the vehicles and the relative speed of the vehicles indicates that a crash is imminent, a system that may be overridden by the driver at any time leaving the driver in control to react in an emergency, such a vehicle distance measuring safety warning system would be useful and novel.

SUMMARY OF THE DISCLOSURE

Accordingly, embodiments of the inventive disclosures made herein comprise various embodiments of distance measurement sensors, controllers and alarms for sensing and calculating the distance between two motor vehicles and generating an alarm if the distance is less than a defined minimum distance, as well as other additional functions depending on the embodiment.

Embodiments of the inventive disclosures comprise a vehicle distance measuring safety warning system having one or more distance measurement sensors secured to the exterior of a motor vehicle for measuring the distance from the driver's vehicle to a second vehicle. A vehicle distance alarm is provided and mounted within the vehicle to alert a vehicle operator when the distance between the driver's vehicle and the second vehicle is less than a configured minimum distance, indicating an unsafe driving condition. The vehicle is equipped with an event record display device mounted within the vehicle, typically on or in the dashboard of the vehicle. The event record display device records and displays the time/date of the 20 most recent occurrences when the distance warning alarm was last detected. An electronic control unit is electrically connected to the distance sensor or sensors. The electronic control unit receives measurement signals from the sensors, calculates the distance between the driver's vehicle and the second vehicle. In some embodiments the electronic control unit also calculates speed of the driver's vehicle to the speed of the second vehicle to determine if the two vehicles are continuing too close upon each other. As above, if the calculated distance is less than a configured minimum distance indicating an unsafe driving condition, then the electronic control unit generates an alarm to alert the driver that the driver is tailgating too close to the vehicle the driver is following behind (the second vehicle).

In one or more embodiments the distance sensor or sensors are mounted to the vehicle in a forward facing direction so as to detect the distance between the driver's vehicle and another vehicle the driver is trailing.

In one or more embodiments the vehicle distance measuring safety warning system alarm comprises a warning light, an audible alarm or a combination of a warning light and audible alarm.

In one or more embodiments the vehicle distance measuring safety warning system distance measurement sensors comprise any of the following: one or more high frequency radar distance sensors, one or more pulsed laser radar distance sensors, one or more ultrasonic distance sensors, or one or more infrared distance sensors.

In one or more embodiments of the vehicle distance measuring safety warning system the electronic controller calculates difference in speed between the driver's vehicle and the second or leading vehicle. The system further includes an engine throttle adjustment actuator which is electrically interfaced to the electronic controller. The engine throttle adjustment actuator is configured to reducably override the driver's throttle setting when the distance alarm is generated by the controller. The override reduces the engine speed causing the vehicle speed to slow and thereby increasing the distance between the driver's vehicle and the second vehicle above the configured minimum distance.

In one or more embodiments the vehicle distance measuring safety warning system further includes a brake actuator interfaced to the electronic controller for proportionally applying the vehicle brakes. The electronic controller is additionally adapted to calculate the relative speed between the driver's vehicle and the second vehicle. When, based upon the calculated relative speed between the driver's vehicle and the second vehicle, together with the calculated distance between the vehicles indicating a crash may be imminent, the electronic controller commands the brake actuator to proportionally apply the vehicle brakes to slow the vehicle with the goal of averting a crash. By proportionately apply the brakes we mean the brakes are applied to the degree that the driver's vehicle is slowed to the extent that the vehicle speed is reduced to less than the speed of the second vehicle, while increasing the distance between the vehicles to at least the configured minimum distance.

In one or more embodiments of the vehicle distance measuring safety warning system the distance sensors, electronic controller and actuators are adapted to communicate over a vehicle network, the vehicle network providing the electrical interface between the sensor, controller and actuators. Several types of vehicle networks are in common use in motor vehicles. One non-limiting example is the controller area network (CAN). The controller area network (CAN) is a multicast shared serial bus standard, originally developed in the 1980s by Robert Bosch GmbH. CAN was specifically designed to be robust in electromagnetically noisy environments and can utilize a differential balanced wired network serial line like RS-485. Another non-limiting example of a vehicle based network is a network based on the FlexRay™ protocol. FlexRay™ is a communications protocol driven by the FlexRay Consortium and developed to provide high data throughput for more recent motor vehicle developments in steer by wire, brake by wire and stability control systems, for example. Other vehicle network physical layers and protocols are known to those skilled in the art and are applicable to the vehicle network gateway apparatus as disclosed herein.

Also disclosed herein is a vehicle distance measuring safety warning method which comprises the steps of configuring at least one minimum distance setting defining the minimum configured 'safe' distance between the driver's vehicle and the second or leading vehicle the driver is following. Then calculating the distance between the driver's vehicle and the second vehicle using signals from at least one distance sensor secured to the driver's vehicle. The calculated distance between the vehicles is compared to the configured minimum distance, activating an alarm if the calculated distance is less than the configured minimum distance indicating the driver is 'tailgating' the second vehicle too closely, resulting in an unsafe driving condition.

In a second embodiment of the vehicle distance measuring safety warning method, when an alarm condition is detected, the system sets back the engine throttle to reduce vehicle speed to effect increasing calculated distance above the minimum distance.

In a third embodiment of the vehicle distance measuring safety warning method, when the relative speed between the driver's vehicle and the second or leading vehicle together with the calculated distance between the vehicles indicates a crash may be imminent, the controller commands the brake actuator to apply the vehicle brakes proportionally (as discussed earlier) to an amount required to reduce vehicle speed to avoid the crash.

It is an objective of the inventive disclosure made herein to provide a vehicle distance measuring safety warning system that monitors the distance between a motor vehicle and the next motor vehicle in front of the driver's motor vehicle.

It is another objective of the inventive disclosure made herein to provide a vehicle distance measuring safety warning system that generates an alarm when the distance between the driver's motor vehicle and the next motor vehicle which the driver is following is less than a configured minimum distance, indicating an unsafe driving condition.

It is another objective of the inventive disclosure made herein to provide a vehicle distance measuring safety warning system that generates a recording of when the alarm was activated. The device memory will retain the 20 most recent occurrences.

It is another objective of the inventive disclosure made herein to provide a vehicle distance measuring safety warning system that in certain embodiments is adapted to reduce the engine throttle to slow the vehicle when the distance alarm is generated so as to increase the distance between the motor vehicles.

It is another objective of the inventive disclosure made herein to provide a vehicle distance measuring safety warning system that in certain embodiments is equipped to activate the vehicle braking system when the detected distance between the vehicles and the relative speed of the vehicles indicates that a crash is imminent.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
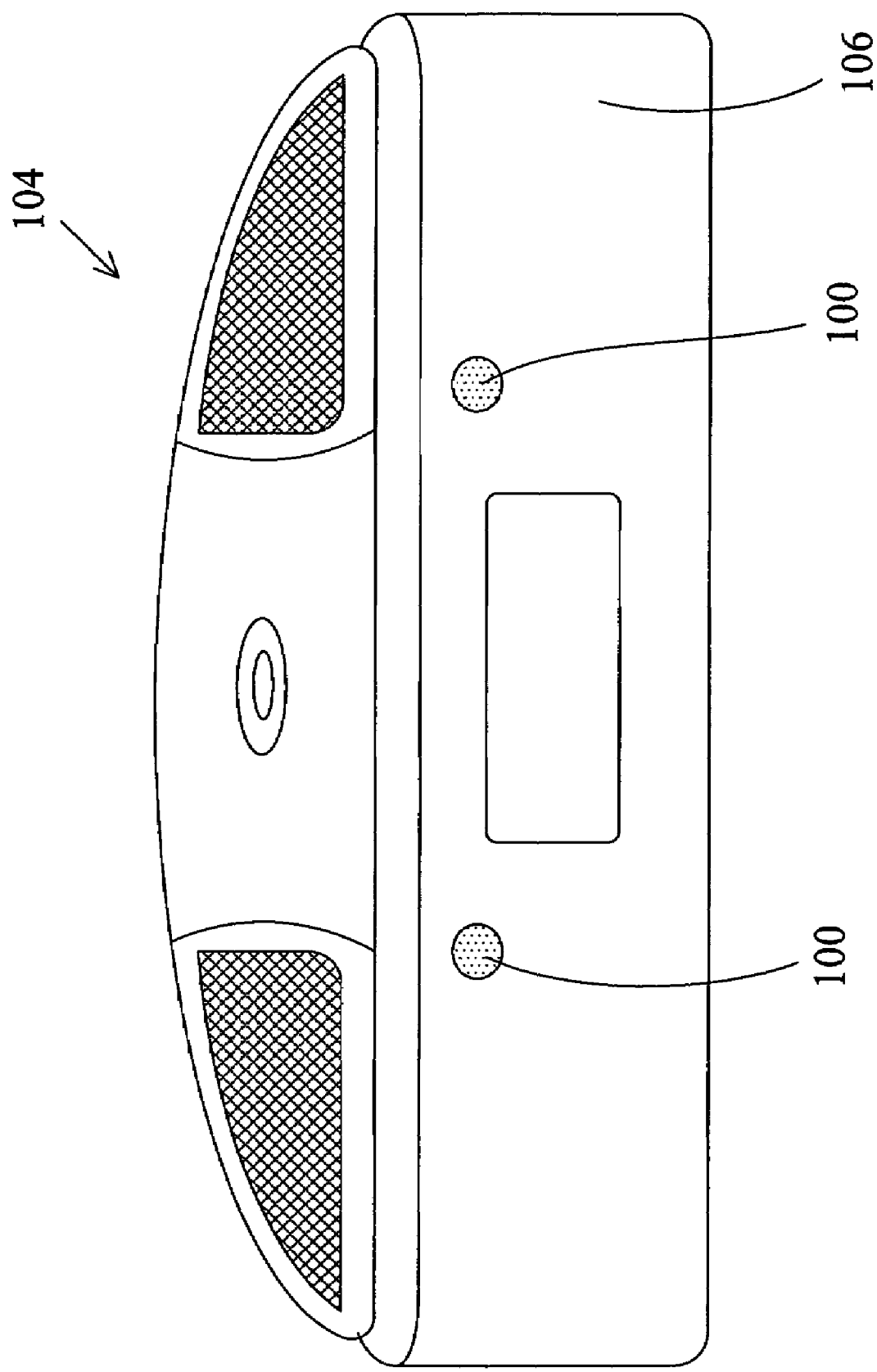
FIG. 1 depicts a front view of a motor vehicle with two distance sensors mounted into the front bumper of the vehicle in accordance with the inventive disclosures herein.

FIG. 1 depicts a front view of a motor vehicle 104 with two distance sensors 100 mounted into the front bumper 106 of the motor vehicle 104 in accordance with the inventive disclosures herein. The distance sensors 100 are directed to the front of the vehicle 104 to measure the distance between the vehicle 104 and a second vehicle (not show) that vehicle 104 is following or tracking behind of. The invention is not limited to use of distance sensors 100 mounted to the front of a vehicle. For example, the sensors may be located on other portions of the vehicle as long the sensing field of the distance sensor or sensors are directed forwards. It is envisioned in this invention that distance sensors may also be provided at the rear of the vehicle, or installed on the vehicle in another location and directed rearwards to detect the distance between the vehicle 104 and another vehicle following vehicle 104. The alarm can be then be used to warn the driver of another vehicle tailgating too closely.

Figure 2:
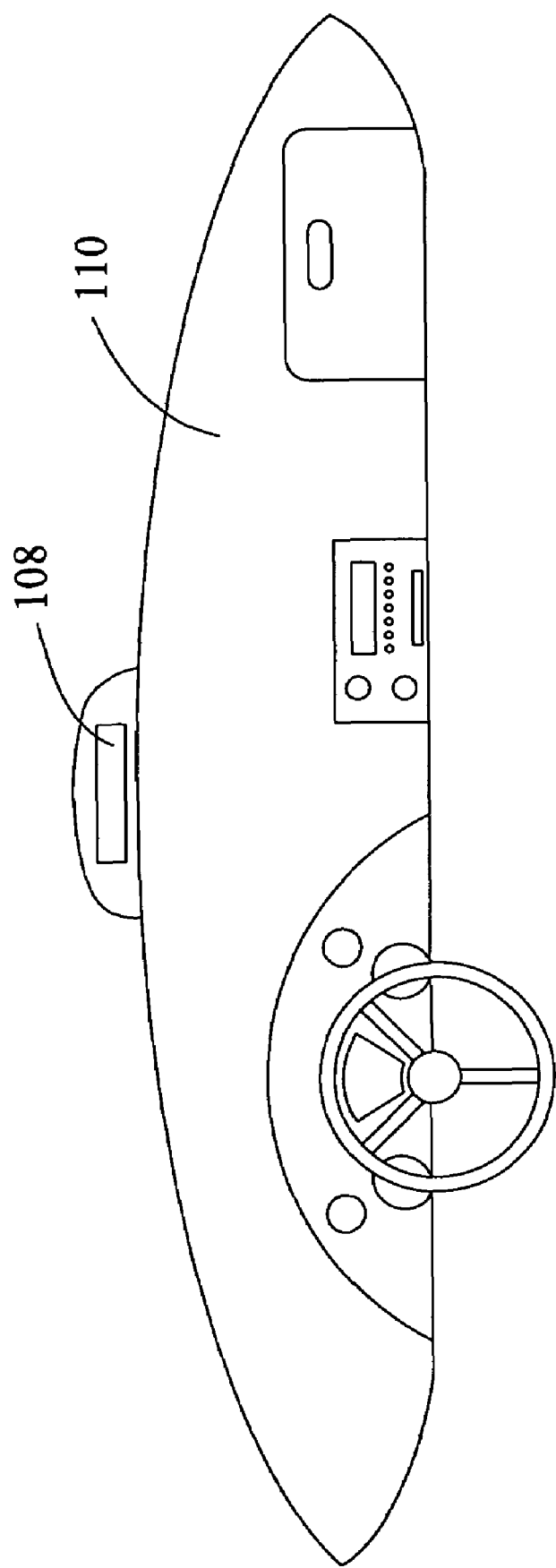
FIG. 2 depicts an interior view of a motor vehicle passenger cabin illustrating the dashboard with an alarm light and the event record display device secured to the dashboard in accordance with the inventive disclosures herein.

FIG. 2 depicts an interior view of a motor vehicle equipped with features of the present inventive disclosure. Passenger cabin includes an alarm light and the event record display device 108 secured to the dashboard 110. In the illustrated embodiment the vehicle distance alarm and the event record display are combined into a single device 108 mounted to the dashboard 110 of the vehicle. The distance alarm and event record display do not need to be combined and can be implemented as separate devices. The vehicle distance alarm 108 includes an alarm light which illuminates, either steadily or flashing, when the distance sensor or sensors (100, FIG. 1) and the electronic controller (not shown) detect that the vehicle (104, FIG. 1) is following behind another vehicle by less than the configured minimum distance. The vehicle distance alarm 108 may include an audible alarm that activates in conjunction with the alarm light as another means of alerting the driver. The distance alarm alerts the driver that he/she may be driving too close behind the vehicle in front to have sufficient reaction time and distance to avoid a collision in the event traffic suddenly stops or another unexpected traffic event occurs.

Figure 3:
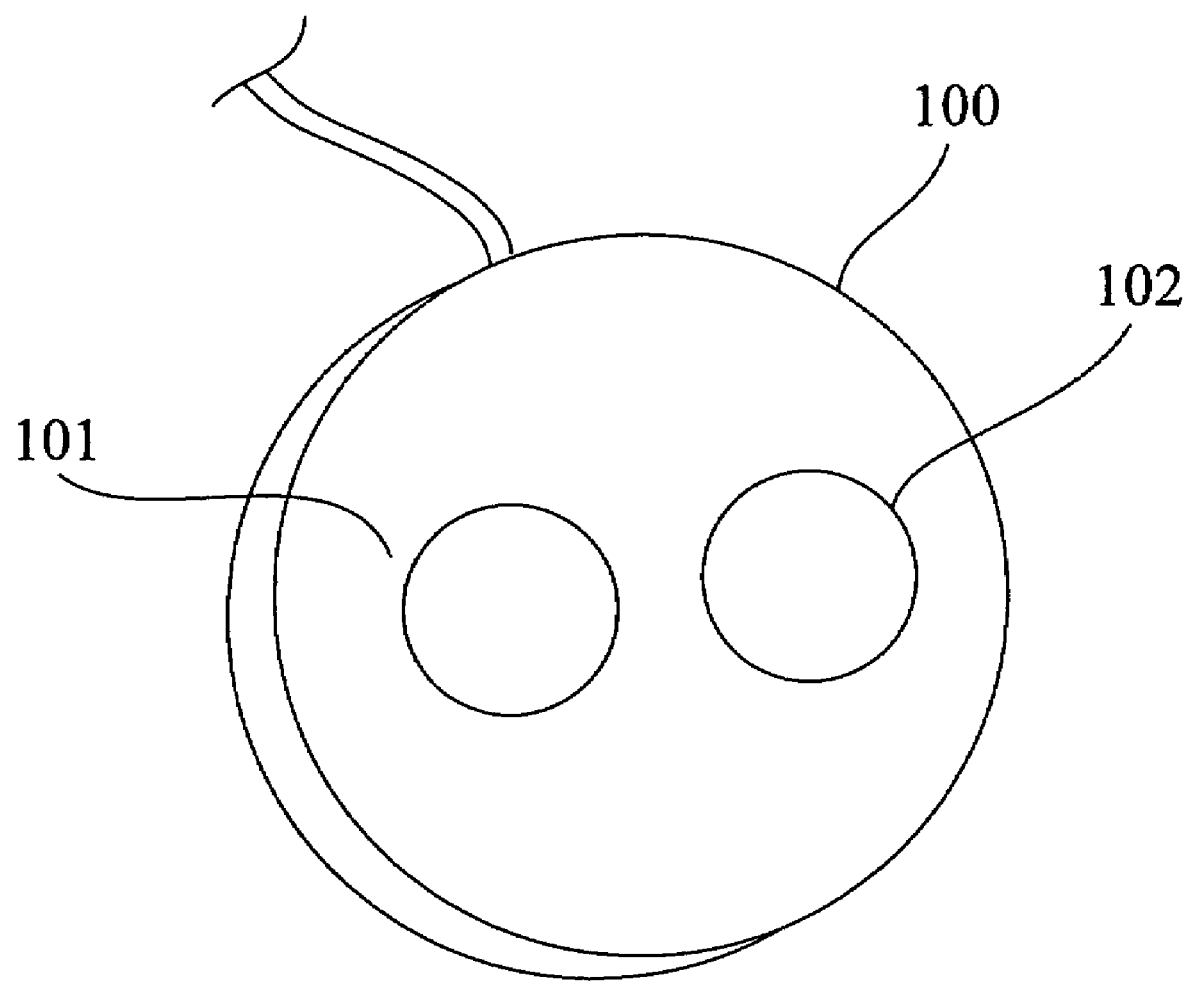
FIG. 3 illustrates one embodiment of a high frequency radar distance sensor in accordance with the inventive disclosures herein.

FIG. 3 illustrates one embodiment of a high frequency radar distance sensor 100 in accordance with the inventive disclosures herein. The distance sensor 100 is not limited to the use of a radar sensor but may instead be any of a variety of known non-contact distance sensors suitable for automotive use such as the high frequency radar distance sensor, a pulsed laser radar distance sensor, an ultrasonic distance sensor, an infrared distance sensor, or a combination of these sensor technologies. High frequency radar sensors are known and applied as vehicle distance sensors in certain reverse backup automotive applications. High frequency radar distance sensors 100 typically operate in the 60-100 GHz radar range and utilize the pulse modulated Doppler principle to provide independent measurements of relative speed and distance between the driver's vehicle and the vehicle immediately in front of the driver's vehicle. The illustrated distance sensor 100 has a radar transmitter element 101 and a receiver element 102 embedded in the common housing of the distance sensor 100. The invention is not limited to the use of radar distance sensors nor to the use of distance sensors configured as illustrated in FIG. 3, but instead may utilize any of the known vehicle distance sensor technologies and sensor configuration suitable for automotive vehicle to vehicle distance measurements.

Figure 4:
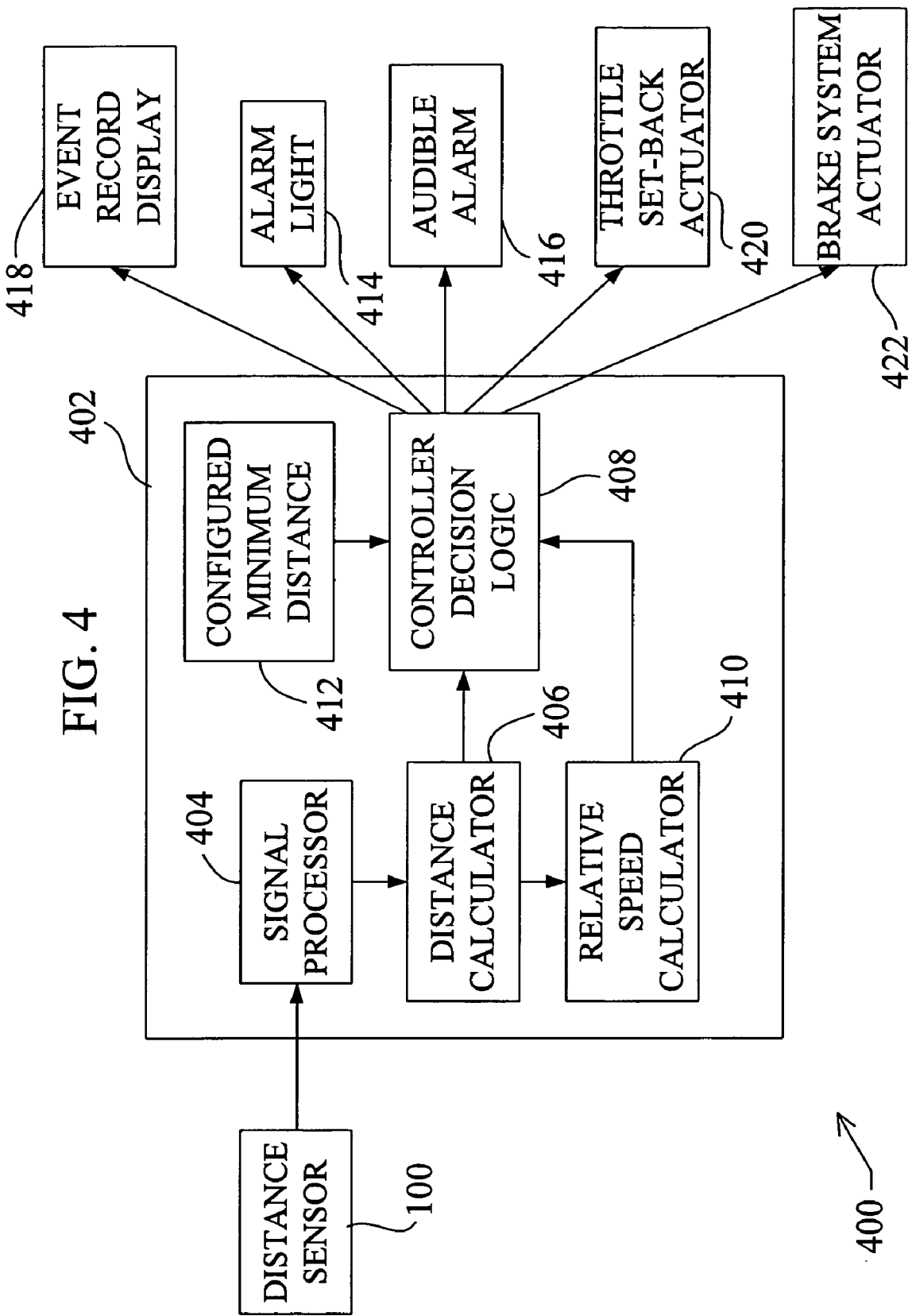
FIG. 4 illustrates a vehicle distance measuring safety warning system in accordance with the inventive disclosures herein.

FIG. 4 illustrates a vehicle distance measuring safety warning system 400 in accordance with the inventive disclosures herein. The vehicle distance sensor 100 is connected to the electronic control unit 402 that provides the signal processing, distance/speed calculations and decision logic to implement the vehicle distance measuring safety warning system 400. The signal processor 404 comprises interface electronic and driver electronics and software to interface the electronic controller 402 to the distance sensor 100. Only one distance sensor 100 is shown for simplicity; however it is to be understood that the vehicle distance measuring safety warning system 400 may include any number of distance sensors 100 to provide the detection field desired. The distance signal from the signal processor 404 is passed to the distance calculator 406 which calculates, based upon received/returned signal characteristics detected by the sensor 100, the distance between the driver's vehicle and the next vehicle immediately in front. The calculated vehicle to vehicle distance is passed to the control decision logic block 408. The relative speeds between the driver's vehicle and the vehicle immediately in front is calculated by the relative speed calculator 410. The relative speed between two vehicles may be determined by a number of methods. One method, if the sensor supports it, is a Doppler shift measurement. The Doppler shift measurement compares the frequency of the returned or echo signal to the originally transmitted signal, the frequency shift indicating the relative speed between the driver's vehicle and the vehicle immediately in front. Another method of determining the relative speed is to compare the current distance measurement to the previous distance measurement, and divide the difference in distance by the elapsed time between the measurements. In this way the change in distance divide by elapsed sample to sample measurement time provides the relative speed between the two vehicles. The relative vehicle to vehicle speed is passed to the controller decision logic 408. A distance alarm setting in the form of a configured minimum distance between the driver's vehicle and the vehicle immediately in front is set in 412. The minimum distance setting may be configured into the electronic controller by the vehicle owner within lawful limits, or in some instances may be preconfigured into the vehicle distance measuring safety warning system 400 by the vehicle manufacturer or other entity. The control decision logic module 408 compares the calculated vehicle to vehicle distance from 406 to the configured minimum distance 412. If the calculated distance is less than the configured distance, then the control decision logic block 408 activates the alarm light 414 and audible alarm 416 to alert the driver that he/she is following too close to the vehicle immediately in front of the driver's vehicle. The control decision logic block 408 records the time/date of the alarm and provides the time/date of the 20 most recent occurrences to the event record display 418.

In certain embodiments the vehicle distance measuring safety warning system 400 includes a throttle set-back actuator 420. When the vehicle to vehicle distance is less than the configured minimum distance, the actuator operates to gently and automatically slow the car and increase vehicle to vehicle distance by acting on the vehicle throttle to reduce the engine throttle speed. This response continues until the vehicle to vehicle distance increases beyond the configured minimum distance at which point the vehicle distance measuring safety warning system 400 gently releases its throttle set-back on the vehicle throttle permitting the driver full control of the vehicle speed. In certain embodiments if the speed reduction due to the throttle set-back actuator is not sufficient, for example because another car suddenly cuts out in front, the control decision logic block 408 activates a brake system actuator 422. The brake system actuator 422 acts directly on the vehicle brakes (in combination with the engine throttle set-back as described above) to further slow the vehicle with the aim of automatically intervening to prevent a collision. The vehicle driver, however, remains in control at all times. The throttle setback and braking action of the vehicle distance measuring safety warning system 400 may be overridden by the driver by depressing the accelerator to further accelerate the vehicle, or by applying the brakes. The vehicle distance measuring safety warning system 400 provides an additional margin of safety for a driver who may be distracted while driving by automating certain initial responses to unsafe driving situations with the aim of improving safety and saving lives.

Figure 5:
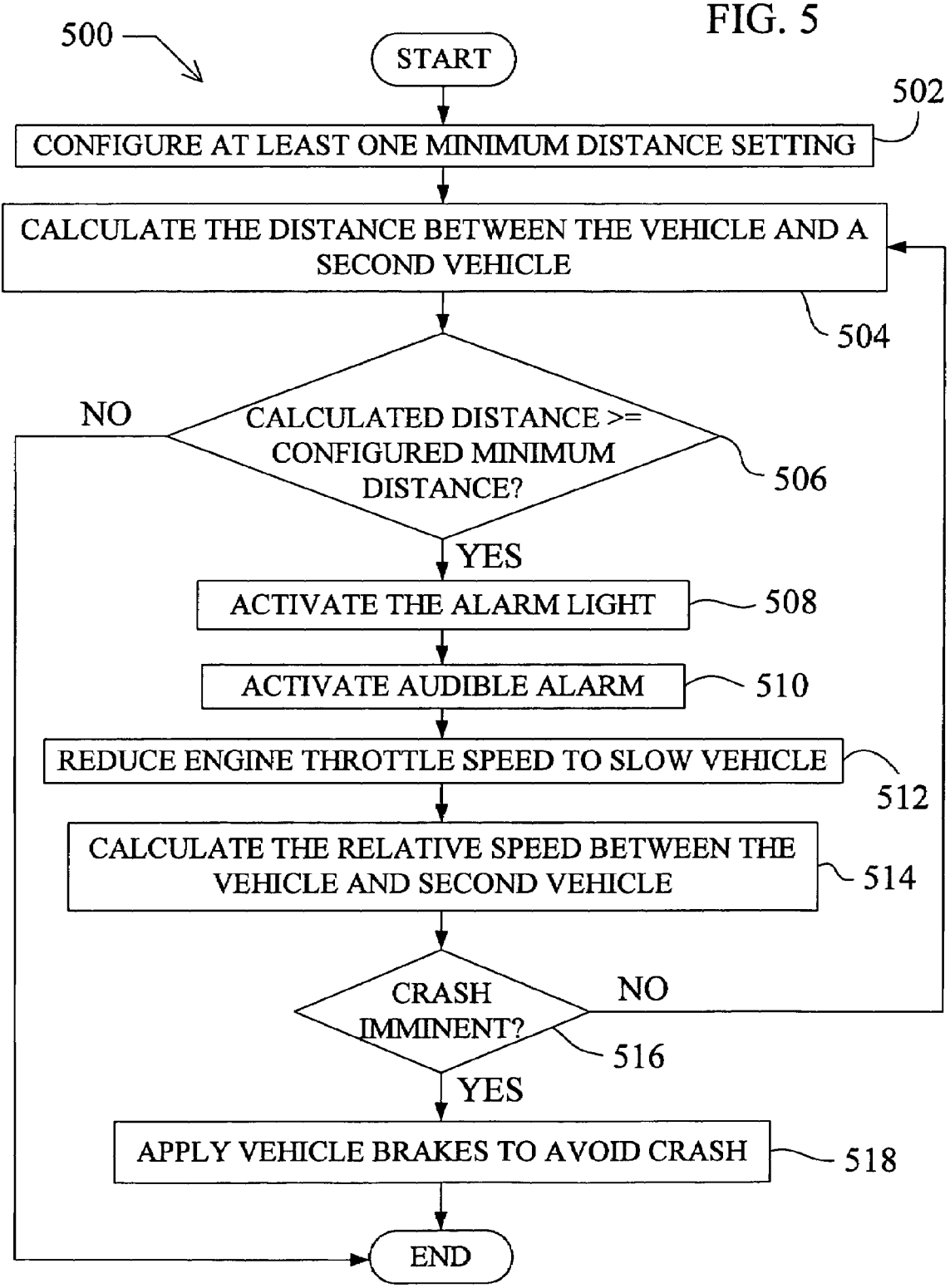
FIG. 5 illustrates a vehicle distance measuring safety warning method in accordance with the inventive disclosures herein.

FIG. 5 illustrates a vehicle distance measuring safety warning method 500 in accordance with the inventive disclosures herein. The method begins at block 502 by configuring a minimum vehicle to vehicle distance setting into the system. At block 504 the vehicle distance measuring safety warning system calculates the distance between the vehicle and a second vehicle immediately in front. At block 506 the calculated vehicle to vehicle distance is compared to the configured minimum distance. If the calculated distance is greater than the configured minimum distance then the method ends, otherwise, control transfers to block 508. At block 508 an alarm light is activated to alert the driver that he/she is following too close to the vehicle in front. Additionally, an audible alarm is activated at block 510 to aid in gaining the attention of the driver to the alarm condition. The vehicle's engine speed is then reduced at block 512 to slow the vehicle. At block 514 the relative speed between the vehicle and the vehicle immediately in front (also referred to as the second vehicle herein) is calculated. If the relative speeds indicate that the distance between the vehicles is decreasing (vehicles are closing upon one another) at block 516, then the vehicle brakes are proportionally applied at block 518 to further reduce the vehicle speed to prevent a collision. As discussed with FIG. 4 above but not illustrated in FIG. 5, the throttle set-back and braking action of the vehicle distance measuring safety warning system 400 may be overridden by the driver by depressing the accelerator to further accelerate the vehicle, or by applying the brakes. The driver always is in control. The system is an aid to a distracted driver but does not limit the driver's intentional responses to an emergency situation.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, electrical and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle distance measuring safety warning system comprising:
    at least one distance measurement sensor secured to the exterior of a motor vehicle for measuring the distance from the vehicle to a second vehicle;
    a vehicle distance alarm mounted within the vehicle to alert a vehicle operator;
    an event record display mounted within the vehicle identifying time/date of twenty most recent alarm occurrences of detected distance warning alarms; and
    an electronic control unit electrically connected to said sensors, the control unit receiving measurement signals from the sensors, calculating distance between the vehicle and the second vehicle, determining if the calculated distance is less than a minimum distance and generating a distance alarm if the distance is less than the minimum distance.

2. The vehicle distance measuring safety warning system of claim 1, wherein
    at least one sensor is mounted to the vehicle in a forward facing direction; and
    the vehicle is following behind the second vehicle.

3. The vehicle distance measuring safety warning system of claim 2, wherein
    the alarm comprises any of: a warning light, an audible alarm.

4. The vehicle distance measuring safety warning system of claim 3, wherein
    the distance measurement sensors comprises any of: a high frequency radar distance sensor, a pulsed laser radar distance sensor, an ultrasonic distance sensor, an infrared distance sensor.

5. The vehicle distance measuring safety warning system of claim 4, wherein
    the control unit calculates difference in speed between the vehicle and the second vehicle; and
    wherein the system further comprises an engine throttle adjustment actuator electrically interfaced to the control unit, the actuator configured to reducably override operator throttle setting when the distance alarm is generated by the control unit.

6. The vehicle distance measuring safety warning system of claim 5, further comprising a brake actuator interfaced to the control unit for proportionally applying the vehicle brakes,
    wherein the control unit additionally calculates relative speed between the vehicle and the second vehicle; and
    wherein the control unit proportionally applies the vehicle brakes if a crash condition appears imminent.

7. The vehicle distance measuring safety warning system of claim 6, wherein
    the sensors, the control unit and actuators are adapted to communication over a vehicle network, the vehicle network providing the electrical interface between the sensor, control unit and actuators.

8. A vehicle distance measuring safety warning method comprising:
    configuring at least one minimum distance setting;
    calculating the distance between the vehicle and a leading second vehicle using signals from at least one distance sensor;

comparing the calculated distance to the configured minimum distance; and activating an alarm light and updating a displayed alarm list of last twenty alarms and time/dates of occurrence, if the calculated distance is less the configured minimum distance.

9. The method of claim 8, wherein after the activating step the method further comprises:

reducing the engine throttle to reduce vehicle speed to effect increasing calculated distance above the minimum distance.

10. The method of claim 9, wherein after the reducing step the method further comprises:

computing the relative speed between the vehicle and the second vehicle; and proportionally applying the vehicle brakes if relative speed and computed distance indicates a crash condition appears imminent, wherein the brakes are applied proportionally to an amount required to reduce vehicle speed to avoid a crash.

11. The method of claim 10, wherein after the computing step the method further comprises:

ending the method if vehicle driver performs any of: adjusting accelerator to accelerate the vehicle, actuating brake to slow the vehicle.

* * * * *